(12) United States Patent
Gaspar

(10) Patent No.: US 6,554,306 B1
(45) Date of Patent: Apr. 29, 2003

(54) WHEEL PROTECTION DEVICE FOR A VEHICLE

(76) Inventor: Terry J. Gaspar, 46419 244th St., Colton, SD (US) 57018-5130

( * ) Notice: Subject to any disclaimer, the term of this patent is extended or adjusted under 35 U.S.C. 154(b) by 0 days.

(21) Appl. No.: 09/976,732

(22) Filed: Oct. 12, 2001

(51) Int. Cl.[7] .......................... B60R 19/00; B62D 25/16
(52) U.S. Cl. .................... 280/160; 280/848; 280/159
(58) Field of Search .................. 280/160, 770, 280/847, 848, 153.5, 154, 849, 851, 159, 152.2; 180/84; D12/184

(56) References Cited

U.S. PATENT DOCUMENTS

| 2,414,676 A | * | 1/1947 | Taurman et al. ............. 280/851 |
| 2,605,119 A |   | 7/1952 | Earnest |
| 2,940,773 A | * | 6/1960 | Eaves ........................... 280/851 |
| D205,137 S  | * | 6/1966 | Weasel, Jr. ................... D12/185 |
| 3,497,237 A | * | 2/1970 | Vis .............................. 280/847 |
| 3,684,311 A | * | 8/1972 | Pierce ......................... 280/847 |
| 3,869,617 A | * | 3/1975 | Gaussoin et al. ........... 280/851 |
| 4,021,055 A |   | 5/1977 | Okland |
| D267,864 S  |   | 2/1983 | Watanabe |
| 4,372,570 A |   | 2/1983 | Goodall |
| 4,377,294 A | * | 3/1983 | Lockwood et al. ......... 280/851 |
| D344,707 S  |   | 3/1994 | Brooks |
| 5,348,328 A | * | 9/1994 | Millington .................... 280/63 |
| 5,582,430 A |   | 12/1996 | Bauer et al. |
| 5,697,645 A |   | 12/1997 | Nagler |
| 5,794,976 A |   | 8/1998 | Stevicks |
| 6,152,469 A | * | 11/2000 | Gadowski .................... 280/154 |
| 6,193,278 B1 | * | 2/2001 | Ward et al. .................. 280/848 |

FOREIGN PATENT DOCUMENTS

| EP | 0 074 844 A1 | 9/1982 |
| EP | 0 672 577 A2 | 3/1995 |
| EP | 0 795 458 A1 | 9/1997 |

* cited by examiner

*Primary Examiner*—Paul N. Dickson
*Assistant Examiner*—Laura B. Rosenberg

(57) ABSTRACT

A wheel protection device for a vehicle for preventing flying debris from striking the rear tire. The wheel protection device includes a mounting bracket for mounting on the front portion of the fender of the vehicle; and a debris deflection member being attached to the mounting bracket and being adapted to extend below the fender of the vehicle forward of the wheel when the mounting bracket is mounted on the front portion of the fender. The debris deflection member has a curved outer surface for orienting in a forward direction on the vehicle to deflect debris laterally of a path of the wheel.

12 Claims, 4 Drawing Sheets

WHEEL PROTECTION DEVICE FOR A VEHICLE

BACKGROUND OF THE INVENTION

1. Field of the Invention

The present invention relates to wheel debris deflection device and more particularly pertains to a new wheel protection device for a vehicle for preventing debris from striking a tire, such as in the case when debris picked up by a front tire is directed toward a rear tire of the vehicle.

2. Description of the Prior Art

The rotation of the wheels of a vehicle is known to lift debris (such as, for example, stones) from the ground surface and project the debris through the air. The amount of debris raised by the wheel can be significant, especially when the vehicle is traveling over a surface covered with loose stones, such as may be found on gravel roads.

The use of devices to attempt to deflect the flying debris is well known in the prior art. Some of these devices are commonly known as mud guards or mud flaps. The devices of the known prior art are intended to intercept debris soon after the debris moves off of the wheel of the vehicle and before the debris achieves any significant altitude above the ground surface. The main purpose of these devices is to protect the body of the vehicle from being struck by the debris and damaging the finish of the body of the vehicle. To a lesser extent, these known devices are also intended to protect persons and vehicles located behind the vehicle from flying debris raised by the wheels of the vehicle. As a result of these primary functions, the known devices have been mounted on the vehicle at a location rearward of the tire so as to be relatively close to the portion of the tire surface that is moving upwardly from the contact patch of the tire with the ground. This location is typically the area where the greatest amount of debris may be intercepted to protect the vehicle body when the vehicle is moving forward.

However, these known devices are rarely fully effective because a gap is typically left between the lowermost extent of the device and the ground surface so that the device does not hit or drag on the ground surface excessively. This gap permits some of the debris to avoid interception by the known devices, especially at low to moderate vehicle speeds when the trajectory path of the debris tends to stay relatively close to the ground surface. In the case of the front wheels of the vehicle, the low flying debris may never impact the body of the vehicle, and this debris is often thrown directly at the rear wheels of the same vehicle. This phenomenon places the rear wheel at risk for being punctured or otherwise damaged by debris being constantly launched by the front wheel at the rear wheel. This problem is especially pronounced in front wheel drive cars where power applied to the front wheel can cause spinning of the wheel relative to the ground surface when the vehicle takes off from a standing stop. The use of vehicle running boards mounted on the body and extending between the front and rear wheels can even deflect the flying debris from the front wheel back downwardly toward the rear wheel.

The wheel protection device for a vehicle according to the present invention substantially departs from the conventional concepts and designs of the prior art, and in so doing provides an apparatus primarily developed for the purpose of preventing debris which is picked up by the front tire from striking the rear tire.

SUMMARY OF THE INVENTION

In view of the foregoing disadvantages inherent in the known types of wheel debris deflection device now present in the prior art, the present invention provides a new wheel protection device for a vehicle wherein the same can be utilized for preventing debris which is picked up by the front tire from striking the rear tire.

To attain this, the present invention generally comprises a mounting bracket for mounting on the front portion of the rear fender of the vehicle, and a debris deflection member being attached to the mounting bracket and being adapted to extend below the fender of the vehicle forward of the rear wheel when the mounting bracket is mounted on the front portion of the fender. The debris deflection member has a curved outer surface for orienting in a forward direction on the vehicle to deflect debris laterally of a path of the rear wheel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
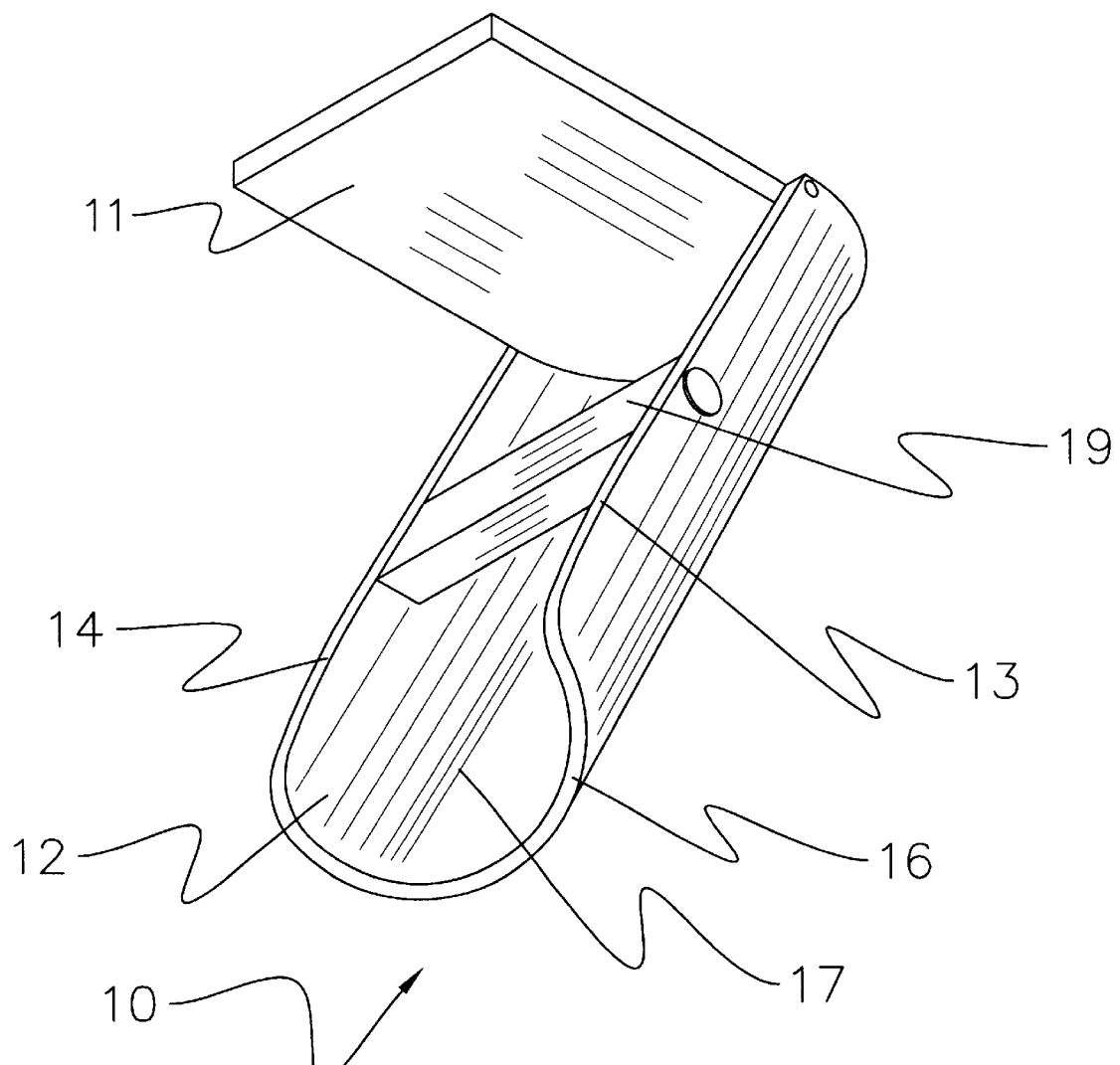
FIG. 1 is a schematic perspective view of a new wheel protection device for a vehicle according to the present invention.
Figure 2:
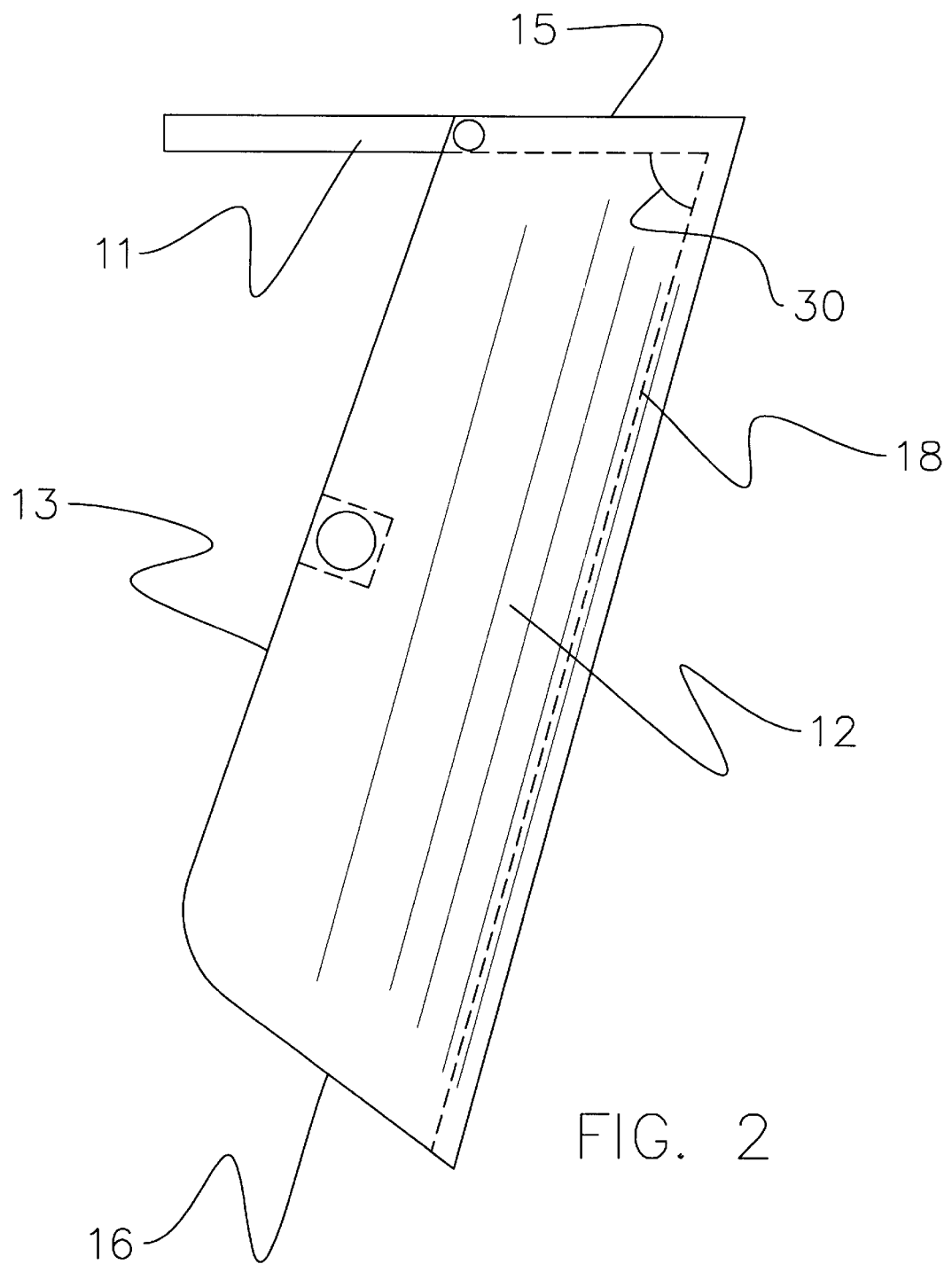
FIG. 2 is a schematic side elevational view of the present invention.
Figure 3:
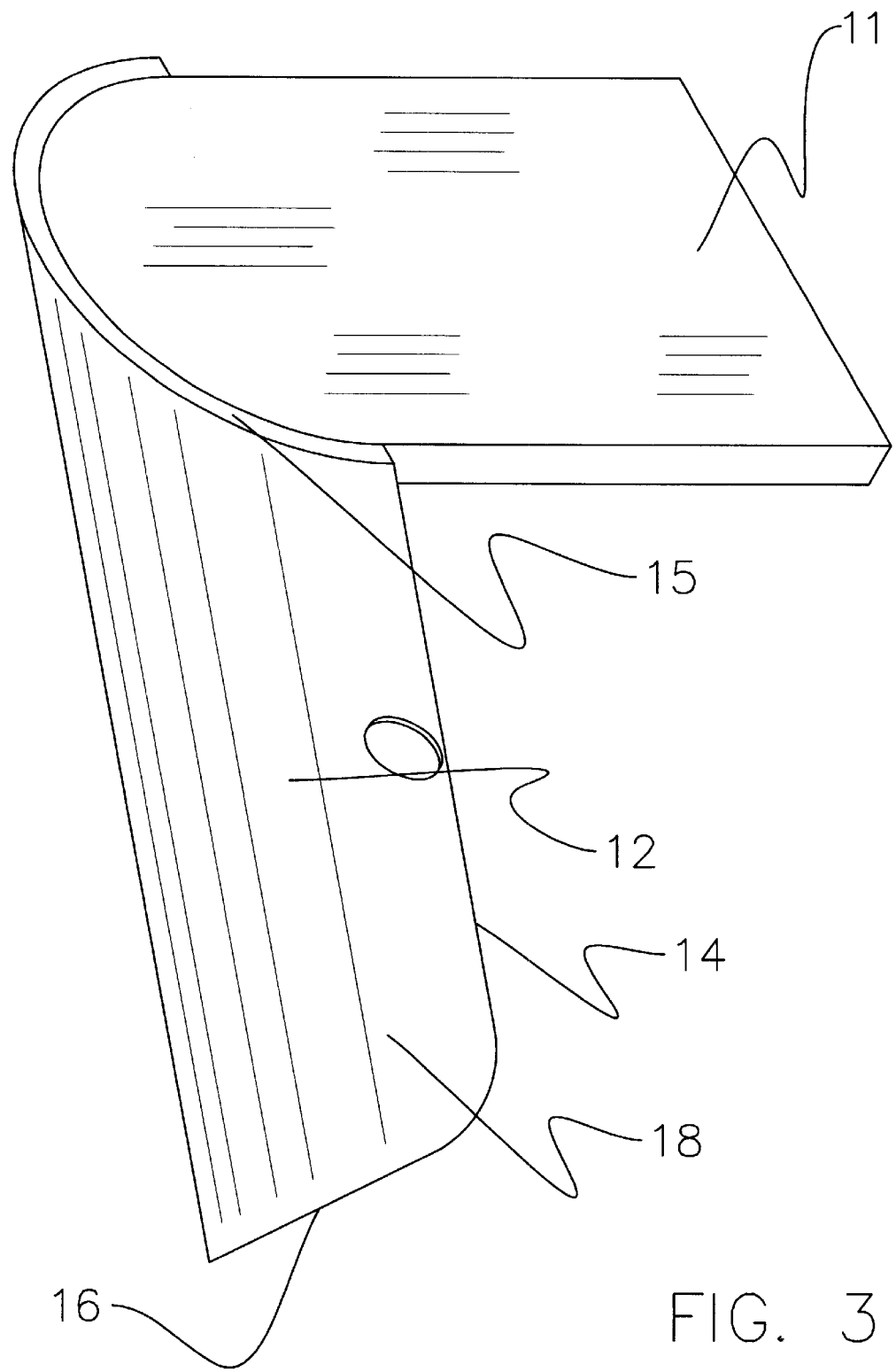
FIG. 3 is a schematic top view of the present invention.
Figure 4:
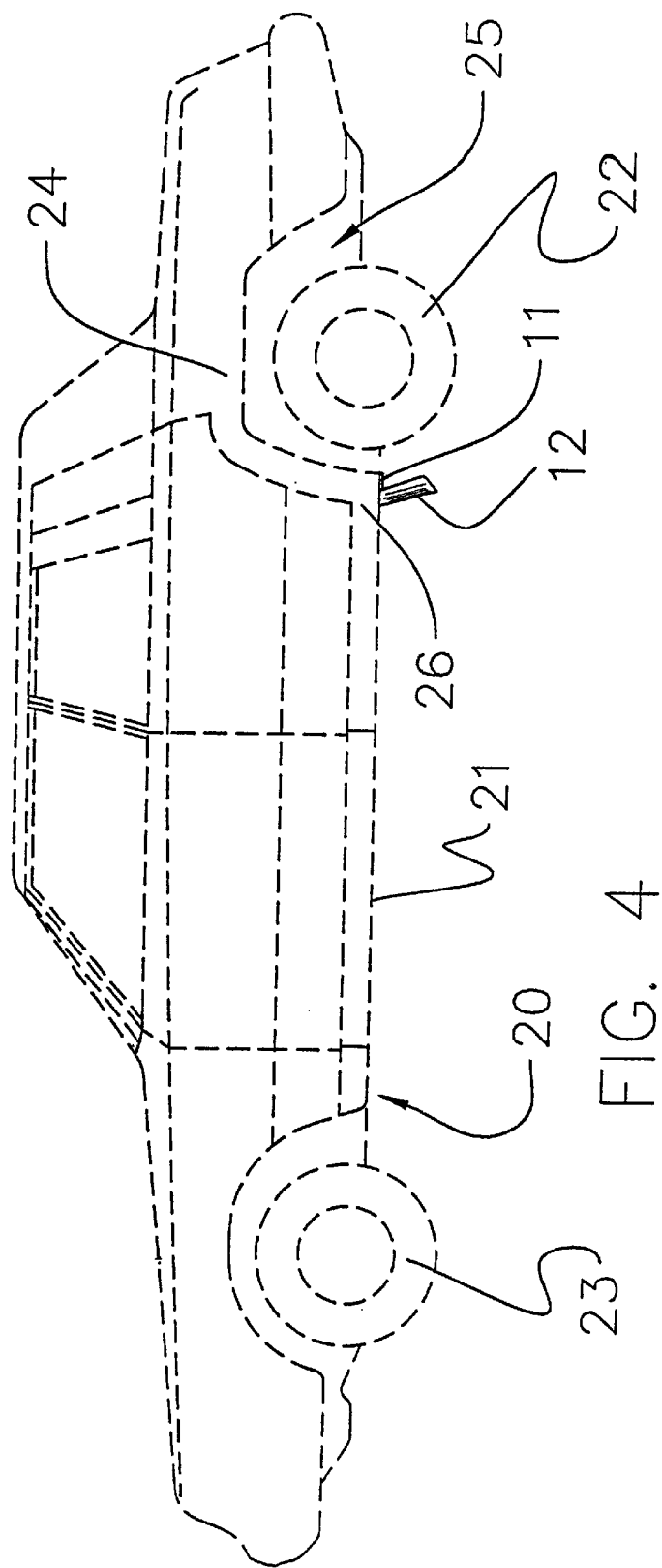
FIG. 4 is a schematic side view of a vehicle having the present invention mounted thereon at a location forward of the rear wheel of the vehicle.

With reference now to the drawings, and in particular to FIGS. 1 through 4 thereof, a new wheel protection device for a vehicle embodying the principles and concepts of the present invention and generally designated by the reference numeral 10 will be described.

As best illustrated in FIGS. 1 through 4, the rear wheel protection device 10 is highly suitable for use on a vehicle 20 having a body 21 having a rear wheel 22 and a front wheel 23. The body 21 also has a rear fender 24 having a rear wheel well opening 25. The rear fender 24 also has a front portion 26 forward of the rear wheel well opening.

The rear wheel protection device 10 of the invention provides a measure of protection to the rear wheel of the vehicle from flying debris raised by a front wheel of the vehicle, although other mounting locations of the device may provide protection to the front wheels or wheels at other positions on the vehicle. The protection device 10 generally comprises a mounting bracket 11 for mounting the device on a vehicle, a debris deflection member 12, and a stabilizing member 19.

In greater detail, the mounting bracket 11 may be mounted on the front portion 26 of the rear fender 24 of the vehicle 20 in a location that is adjacent to and forward of the rear wheel 22. In one preferred embodiment of the invention, the mounting bracket comprises a substantially planar plate that is fastenable to the front portion of the fender of the vehicle. It should be understood that the structure on the vehicle ahead of the rear wheel may vary, and may not comprise a portion of the fender, but may comprise a portion of the chassis of the vehicle or a portion of the frame. The particular structure of the vehicle to which the invention is mounted is not as significant as is that the mounting location is forward of the rear wheel and between the front and rear wheels and relatively close to the wheel well opening for the rear wheel.

The debris deflection member 12 is attached to the mounting bracket and is adapted to extend below a fender of the vehicle forward of the rear tire when the mounting bracket is mounted on the front portion of the fender. The debris deflection member 12 may be elongate with a central longitudinal axis, and may have longitudinal sides 13, 14, and a top 15 and a bottom 16, with the top being mounted on the mounting bracket. Optionally, the debris deflection member may be mounted on the mounting bracket by a pair of pins located on substantially opposite sides of the mounting bracket so that the debris deflection member is adjustably pivotable with respect to the mounting bracket. The central longitudinal axis of the debris deflection member may be oriented at an angle 30 with respect to a plane of the mounting bracket. Illustratively, the angle may measure between approximately 80 degrees and 60 degrees. If the pivoting mounting of the pins is employed between the debris deflection member and the mounting bracket, the angle 30 may be adjustable to adapt to different vehicle factors, such as the amount of available ground clearance.

The debris deflection member 12 may comprise a relatively thin piece of substantially rigid material, and may be laterally curved such that the central longitudinal axis is relatively straight and side portions of the deflection member curve away from the central longitudinal axis. The thin piece of material has an outer side 18 and an inner side 17 with the inner side facing toward the rear wheel of the vehicle. The inner side may be concave and the outer side or surface may be convex. Significantly, the rounded outer and forward face of the debris deflection member tends to deflect flying debris to the side of the rear tire positioned behind the deflection member, and not just downwardly to the ground surface in front of the rear tire where the rear tire is going to roll. Thus, the debris is not left in the path of the rear wheel where it could still damage the wheel. Illustratively, the thin piece of rigid material may be mounted to extend downwardly from the front portion of the rear fender to a height of approximately 6 inches above a ground surface upon which the rear wheel of the vehicle rests, and the debris deflection member may be positioned along a line extending between a front wheel and the rear wheel of the vehicle.

The stabilizing member 19 of the invention may be mounted on the debris deflection member. The stabilizing member may comprise an elongate member having ends that are each mounted on the debris deflection member at locations adjacent to one of the longitudinal sides 13, 14 of the deflection member such that the stabilizing member extends between the longitudinal sides. The stabilizing member may be disposed between the top and a bottom of the debris deflection member, and may be attached to the inner side of the thin piece.

In use, the user may attach the rear tire deflection device 10 to the vehicle 20, and as the user drives the vehicle 20, the debris being picked up by the front tire 23 and being hurled toward the rear tire 22 is deflected around the rear tire 22 with the deflection member 12 to protect and save the rear tire 22.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel protection device for a vehicle of the type having a wheel mounted in a wheel well opening of a fender of a body of the vehicle, the fender having a front portion forward of the wheel well opening, the wheel protection device comprising:

a mounting bracket for mounting on the front portion of the fender of the vehicle, said mounting bracket having a forward end and a rearward end; and a debris deflection member being attached to said mounting bracket and being adapted to extend below the fender of the vehicle forward of the wheel when said mounting bracket is mounted on the front portion of the fender, said debris deflection member having a top attached to said mounting bracket and a bottom free end extending away from said mounting bracket;

wherein said debris deflection member has a curved outer surface for orienting in a forward direction on the vehicle to deflect debris laterally of a path of the rear wheel; and wherein the curved outer surface of said debris deflection member is curved about an axis of curvature positioned between the outer surface and the rearward end of said mounting bracket, said axis of curvature extending from said mounting bracket generally in a direction toward the bottom free end of said debris deflection member such that said axis of curvature is orientatable in a generally vertical direction when said mounting bracket is mounted on the forward portion of the fender;
wherein the axis of curvature of said debris deflection member extends in a direction from the forward end of the mounting bracket toward the rearward end of the mounting bracket and extends in a direction away from a plane of the mounting bracket such that the debris deflection member is positioned in an orientation that slopes rearwardly and away from the fender of the vehicle when the mounting bracket is mounted on a bottom of the fender of the vehicle.

2. The wheel protection device of claim 1, wherein said mounting bracket comprises a substantially planar plate for fastening to the front portion of the fender of the vehicle.

3. The wheel protection device of claim 1, wherein said debris deflection member comprises a thin piece of substantially rigid material.

4. The wheel protection device of claim 1, wherein said debris deflection member has a pair of longitudinal sides and a top mounted on said mounting bracket.

5. The wheel protection device of claim 1, wherein said debris deflection member is elongate, the axis of curvature of said debris deflection members being oriented at an angle with respect to the plane of said mounting bracket.

6. The wheel protection device of claim wherein said angle measures between approximately 80 degrees and 60 degrees.

7. The wheel protection device of claim 1, additionally comprising a stabilizing member being attached to said debris deflection member.

8. The wheel protection device of claim 7, wherein said stabilizing member comprises an elongate member having ends each mounted on said debris deflection member adjacent to a longitudinal side of said debris deflection member.

9. The wheel protection device of claims 7, wherein said stabilizing member is disposed between a top and a bottom of said debris deflection member.

10. The wheel protection device of claim 1, wherein said mounting bracket comprises a substantially planar plate for fastening to the front portion of the fender of the vehicle;
wherein said debris deflection member comprises a thin piece of substantially rigid material;
wherein said debris deflection member has a pair of longitudinal sides and a top mounted on said mounting bracket;
wherein said debris deflection member is elongate, the axis of curvature of said debris deflection members being oriented at an angle with respect to a plane of said mounting bracket;
wherein said angle measures between approximately 80 degrees and 60 degrees;
wherein said stabilizing member comprises an elongate member having ends each mounted on said debris deflection member adjacent to a longitudinal side of said debris deflection member;
a stabilizing member being attached to said debris deflection member; and
wherein said stabilizing member is disposed between a top and a bottom of said debris deflection member.

11. In combination:
a vehicle comprising:
a body having a fender having a wheel well opening, said fender having a front portion forward of the wheel well opening; and
a wheel mounted in said wheel well opening of said fender;
a wheel protection device for protecting the wheel of said vehicle from flying debris, said protection device comprising:
a mounting bracket mounted on the front portion of the fender of the vehicle adjacent to said wheel, said mounting bracket comprising a substantially planar plate fastened to the front portion of the fender of the vehicle, said mounting bracket having a forward end and a rearward end;
a debris deflection member being attached to said mounting bracket and being adapted to extend below a fender of the vehicle forward of the wheel when said mounting bracket is mounted on the front portion of the fender, said debris deflection member being elongate with a central longitudinal axis, said debris deflection member having longitudinal sides and a top mounted on said mounting bracket and a bottom free end extending away from said mounting bracket, the central longitudinal axis of said debris deflection members being oriented at an angle with respect to a plane of said mounting bracket, said angle measuring between approximately 80 degrees and 60 degrees, said debris deflection member comprising a thin piece of substantially rigid material, said thin piece being laterally curved, said thin piece having an outer side and an inner side with said inner side facing toward the wheel of said vehicle, said inner side being concave and said outer surface being convex, said thin piece of rigid material extending downwardly from the front portion of said fender to approximately 6 inches above a ground surface upon which the wheel of said vehicle rests, said debris deflection member being positioned along a line extending between a front wheel and a rear wheel of said vehicle; and
a stabilizing member mounted on said debris deflection member, said stabilizing member being an elongate member having ends each mounted on said debris deflection member adjacent to one of said longitudinal sides thereof such that said stabilizing member extends between said longitudinal sides, said stabilizing member being disposed between said top and a bottom of said debris deflection member, said stabilizing member being attached to said inner side of said thin piece;
wherein the curved outer surface of said debris deflection member is curved about an axis of curvature positioned between the outer surface and the rearward end of said mounting bracket, said axis of curvature extending from said mounting bracket generally in a direction toward the bottom free end of said debris deflection member such that said axis of curvature is oriented in a generally vertical direction.

12. A wheel protection device for a vehicle of the type having a wheel mounted in a wheel well opening of a fender of a body of the vehicle, the fender having a front portion forward of the wheel well opening, the wheel protection device comprising:
a mounting bracket for mounting on the front portion of the fender of the vehicle, said mounting bracket having a forward end and a rearward end; and
a debris deflection member being attached to said mounting bracket and being adapted to extend below the fender of the vehicle forward of the wheel when said mounting bracket is mounted on the front portion of the fender, said debris deflection member having a top attached to said mounting bracket and a bottom free end extending away from said mounting bracket;

wherein said debris deflection member has a curved outer surface for orienting in a forward direction on the vehicle to deflect debris laterally of a path of the rear wheel; and wherein the curved outer surface of said debris deflection member is curved about an axis of curvature positioned between the outer surface and the rearward end of said mounting bracket, said axis of curvature extending from said mounting bracket generally in a direction toward the bottom free end of said debris deflection member such that said axis of curvature is orientatable in a generally vertical direction when said mounting bracket is mounted on the forward portion of the fender;

wherein said debris deflection member is elongate, the axis of curvature of said debris deflection members being oriented at an angle with respect to a plane of said mounting bracket;

wherein said angle measures between approximately 80 degrees and 60 degrees;

wherein said mounting bracket is positioned within a curved inner surface of said debris deflection member, said curved inner surface being opposite said curved outer surface of said debris deflection member.

* * * * *